United States Patent
Akkarakaran et al.

(10) Patent No.: US 12,309,244 B2
(45) Date of Patent: May 20, 2025

(54) COMPRESSION SCHEMES FOR RELAYING PRIOR TO DECODING

(71) Applicant: QUALCOMM Incorporated, San Diego, CA (US)

(72) Inventors: Sony Akkarakaran, Poway, CA (US); Tao Luo, San Diego, CA (US); Junyi Li, Fairless Hills, PA (US); Jung Ho Ryu, Fort Lee, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/332,283

(22) Filed: Jun. 9, 2023

(65) Prior Publication Data

US 2023/0328156 A1    Oct. 12, 2023

Related U.S. Application Data

(63) Continuation of application No. 17/227,073, filed on Apr. 9, 2021, now Pat. No. 11,711,448.

(60) Provisional application No. 63/022,207, filed on May 8, 2020.

(51) Int. Cl.
*H04L 69/04* (2022.01)
*H04L 69/22* (2022.01)
*H04W 28/06* (2009.01)

(52) U.S. Cl.
CPC ............. *H04L 69/04* (2013.01); *H04W 28/06* (2013.01); *H04L 69/22* (2013.01)

(58) Field of Classification Search
CPC ........ H04L 69/04; H04L 69/22; H04W 28/06; H04W 84/047; H04B 7/15528
See application file for complete search history.

(56) References Cited

U.S. PATENT DOCUMENTS

| | | | |
|---|---|---|---|
| 8,949,466 B1* | 2/2015 | Crosbie | H03M 7/6088 709/247 |
| 2012/0140796 A1* | 6/2012 | Dai | H04L 1/0077 375/213 |
| 2015/0063207 A1* | 3/2015 | Nakamura | H04J 11/004 370/328 |
| 2017/0127444 A1 | 5/2017 | Goto et al. | |
| 2017/0244521 A1 | 8/2017 | Lim et al. | |
| 2020/0322204 A1* | 10/2020 | Lu | H04L 27/2649 |
| 2021/0352163 A1 | 11/2021 | Akkarakaran et al. | |

* cited by examiner

*Primary Examiner* — Charles C Jiang
*Assistant Examiner* — Shawn D Miller
(74) *Attorney, Agent, or Firm* — Patterson & Sheridan LLP

(57) ABSTRACT

Certain aspects of the present disclosure provide compression schemes for relaying prior to decoding. A method that may be performed by a wireless relay node includes receiving, from a transmitter node, a first packet intended for a receiver node, compressing pre-decoded samples of the first packet according to a compression scheme, and transmitting, to the receiver node, a second packet including the compressed pre-decoded samples.

28 Claims, 11 Drawing Sheets

COMPRESSION SCHEMES FOR RELAYING PRIOR TO DECODING

CROSS-REFERENCE TO RELATED APPLICATION(S)

This application is a continuation of U.S. patent application Ser. No. 17/227,073, filed Apr. 9, 2021, which claims benefit of and priority to U.S. Provisional Application No. 63/022,207, filed May 8, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for compressing packets for relaying that include information generated prior to decoding (e.g., pre-decoded samples, such as log-likelihood ratios (LLRs)).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New Radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved communication in integrated access and backhaul systems.

Certain aspects of the subject matter described in this disclosure can be implemented in a method for wireless communications by a wireless relay node. The method generally includes receiving, from a transmitter node, a first packet intended for a receiver node. The method generally includes compressing pre-decoded samples of the first packet according to a compression scheme. The method generally includes transmitting, to the receiver node, a second packet including the compressed pre-decoded samples.

Certain aspects of the subject matter described in this disclosure can be implemented in a method for wireless communications by a wireless receiver node. The method generally includes receiving, from a relay node, a relayed packet with pre-decoded samples of a first packet compressed according to a compression scheme. The method generally includes de-compressing the pre-decoded samples. The method generally includes decoding the de-compressed pre-decoded samples to recover the first packet.

Certain aspects of the subject matter described in this disclosure can be implemented in an apparatus for wireless communications. The apparatus include at least one processor, and memory coupled to the at least one processor. The memory generally includes code executable by the at least one processor to cause the apparatus to receive, from a transmitter node, a first packet intended for a receiver node. The memory generally includes code executable by the at least one processor to cause the apparatus to compress pre-decoded samples of the first packet according to a compression scheme. The memory generally includes code executable by the at least one processor to cause the apparatus to transmit, to the receiver node, a second packet including the compressed pre-decoded samples.

Certain aspects of the subject matter described in this disclosure can be implemented in an apparatus for wireless communications. The apparatus include at least one processor, and memory coupled to the at least one processor. The memory generally includes code executable by the at least one processor to cause the apparatus to receive, from a relay node, a relayed packet with pre-decoded samples of a first packet compressed according to a compression scheme The memory generally includes code executable by the at least one processor to cause the apparatus to de-compress the pre-decoded samples. The memory generally includes code executable by the at least one processor to cause the apparatus to decode the de-compressed pre-decoded samples to recover the first packet.

Certain aspects of the subject matter described in this disclosure can be implemented in an apparatus for wireless communications. The apparatus generally includes means for receiving, from a transmitter node, a first packet intended for a receiver node. The apparatus generally includes means for compressing pre-decoded samples of the first packet according to a compression scheme. T The apparatus generally includes means for transmitting, to the receiver node, a second packet including the compressed pre-decoded samples.

Certain aspects of the subject matter described in this disclosure can be implemented in an apparatus for wireless communications. The apparatus generally includes means for receiving, from a relay node, a relayed packet with pre-decoded samples of a first packet compressed according to a compression scheme. The apparatus generally includes means for de-compressing the pre-decoded samples. The apparatus generally includes means for decoding the de-compressed pre-decoded samples to recover the first packet.

Certain aspects of the subject matter described in this disclosure can be implemented in a computer-readable medium storing computer executable code thereon for wireless communications. The computer-readable medium generally includes code for receiving, from a transmitter node, a first packet intended for a receiver node. The computer-readable medium generally includes code for compressing pre-decoded samples of the first packet according to a compression scheme. The computer-readable medium generally includes code for transmitting, to the receiver node, a second packet including the compressed pre-decoded samples.

Certain aspects of the subject matter described in this disclosure can be implemented in a computer-readable medium storing computer executable code thereon for wireless communications. The computer-readable medium generally includes code for receiving, from a relay node, a relayed packet with pre-decoded samples of a first packet compressed according to a compression scheme. The computer-readable medium generally includes code for de-compressing the pre-decoded samples. The computer-readable medium generally includes code for decoding the de-compressed pre-decoded samples to recover the first packet.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
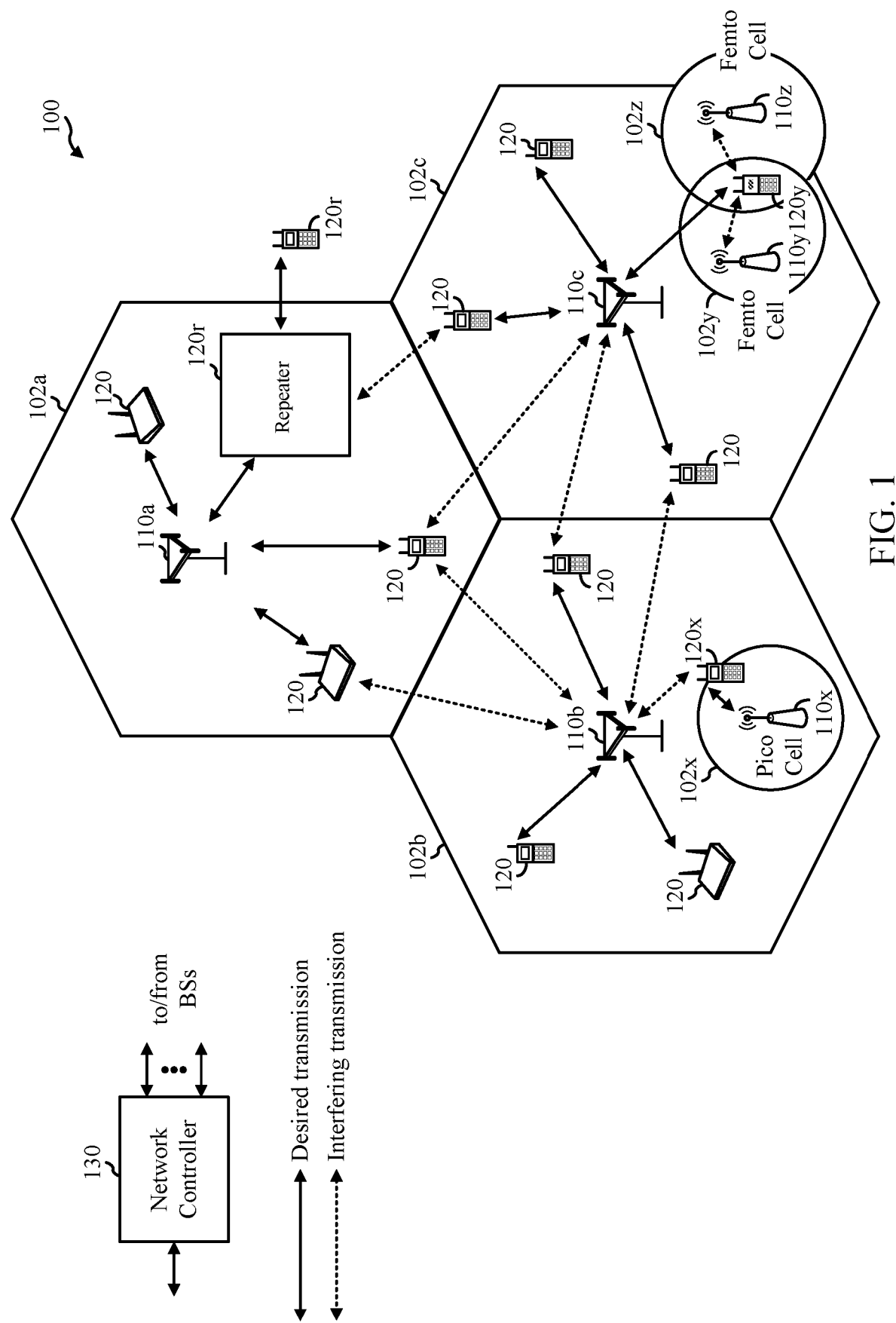
FIG. 1 is a block diagram conceptually illustrating an example wireless communication network, in accordance with certain aspects of the present disclosure.

Aspects of the present disclosure provide apparatus, methods, processing systems, and computer readable mediums to enhance the functionality of directional repeaters (wireless devices that relay directional wireless signals). As described in greater detail below, by relaying pre-decoded samples of a packet, processing time may be reduced and packets relayed faster. By compressing the pre-decoded samples, packet size may be reduced.

The following description provides examples of relaying that include information generated prior to decoding in communication systems. Changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point (AP) may comprise, be implemented as, or known as a Node B, a Radio Network Controller (RNC), an evolved Node B (eNB), a Base Station Controller (BSC), a Base Transceiver Station (BTS), a Base Station (BS), a Transceiver Function (TF), a Radio Router, a Radio Transceiver, a Basic Service Set (BSS), an Extended Service Set (ESS), a Radio Base Station (RBS), an Integrated Access and Backhaul (IAB) node (e.g., an IAB donor node, an IAB parent node, and an IAB child node), or some other terminology.

An access terminal (AT) may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol (SIP) phone, a wireless local loop (WLL) station, a personal digital assistant (PDA), a handheld device having wireless connection capability, a Station (STA), or some other suitable processing device connected to a wireless modem (such as an AR/VR console and headset). Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communications System

FIG. 1 illustrates an example wireless communication network 100 in which aspects of the present disclosure may be performed. For example, the wireless communication network 100 may be an NR system (e.g., a 5G NR network).

As shown in FIG. 1, the wireless communication network 100 may be in communication with a core network 132. The core network 132 may in communication with one or more access points (Aps) 110a-z (each also individually referred to herein as AP 110 or collectively as Aps 110) and/or user equipment (UE) 120a-y (each also individually referred to herein as UE 120 or collectively as UEs 120) in the wireless communication network 100 via one or more interfaces.

Figure 7:
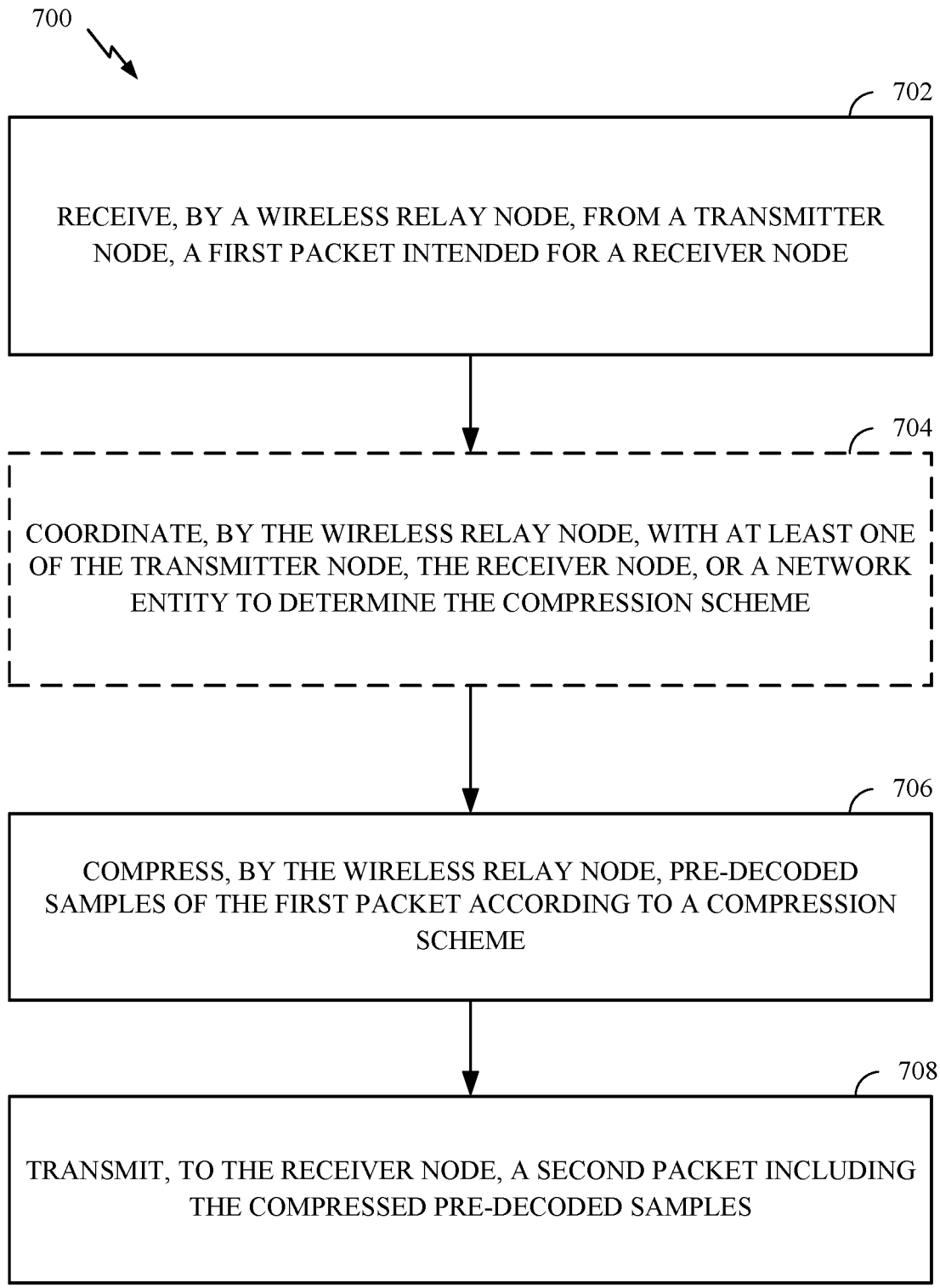
FIG. 7 is a flow diagram illustrating example operations for wireless communications by a wireless relay node, in accordance with certain aspects of the present disclosure.

According to certain aspects, a UE 120r may serve as a relay or repeater and may be configured to perform operations 700 of FIG. 7 to relay pre-decoded samples of packets from a transmitter node (e.g., a base station (BS) or other UE 120) to a receiver node (e.g., a BS or another UE 120). The pre-decoded samples may be compressed using a compression scheme. The receiver node may be configured to perform operations 800 of FIG. 8 to receive and process relayed packets.

As illustrated in FIG. 1, the wireless communication network 100 may include a number of access points (APs) 110 and other network entities. An AP may be a station that communicates with user equipment (UEs) (e.g., a base station (BS) or another UE). Each AP 110 may provide communication coverage for a particular geographic area, sometimes referred to as a "cell," which may be stationary or may move according to the location of a mobile AP. In some examples, the access points may be interconnected to one another and/or to one or more other access points or network nodes (not shown) in wireless communication network 100 through various types of backhaul interfaces (e.g., a direct physical connection, a wireless connection, a virtual network, or the like) using any suitable transport network. In the example shown in FIG. 1, the APs 110a, 110b and 110c may be macro APs for the macro cells 102a, 102b and 102c, respectively. The AP 110x may be a pico AP for a pico cell 102x. The APs 110y and 110z may be femto APs for the femto cells 102y and 102z, respectively. An AP may support one or multiple (e.g., three) cells.

The APs 110 communicate with UEs 120 in the wireless communication network. The UEs 120 (e.g., 120x, 120y, etc.) may be dispersed throughout the wireless communication network 100, and each UE may be stationary or mobile. Wireless communication network 100 may also include relay stations (e.g., relay station 110r), also referred to as relays or the like, that receives a transmission of data and/or other information from an upstream station (e.g., an AP or a UE) and sends a transmission of the data and/or other information to a downstream station (e.g., a UE or an AP), or that relays transmissions for other UEs, to facilitate communication between devices.

A network controller 130 may couple to a set of APs and provide coordination and control for these APs (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
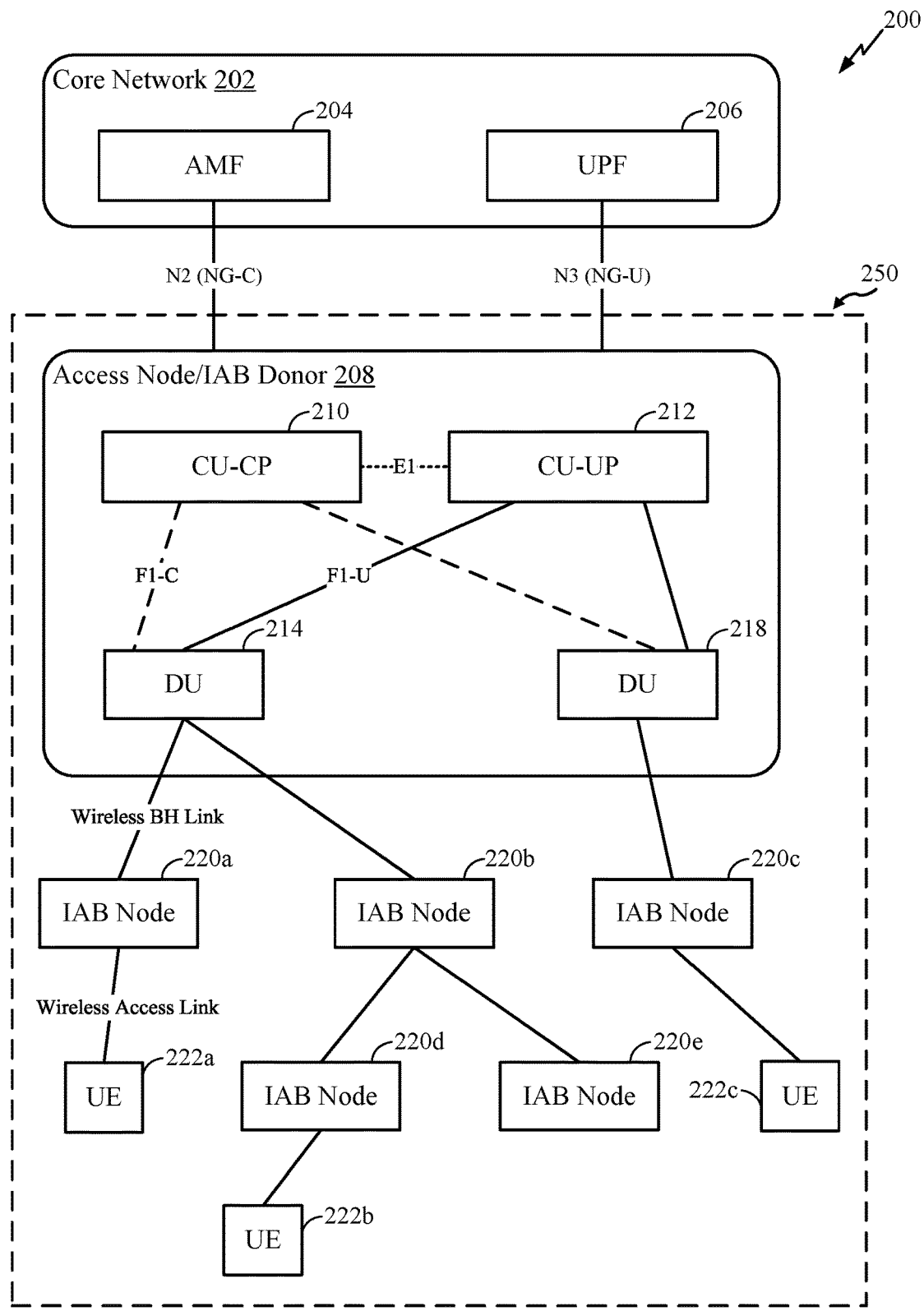
FIG. 2 is a block diagram conceptually illustrating an example architecture of a distributed radio access network (RAN), in accordance with certain aspects of the present disclosure.

FIG. 2 illustrates an example architecture of a distributed radio access network (RAN) 200 that includes an example IAB network 250, which may be implemented in the wireless communication network 100 illustrated in FIG. 1. As shown in FIG. 2, the distributed RAN includes core network (CN) 202 and access node (AN) configured as an IAB donor 208.

As shown, the IAB network 250 includes an IAB donor node 208. The IAB donor node 208 is a RAN node (e.g., access point/gNB that terminates the NR Ng interface with the core network (e.g., next generation NG core)) and is generally connected to the core network via a wireline backhaul link. The CN 202 may host core network functions. CN 202 may be centrally deployed. CN 202 functionality may be offloaded (e.g., to advanced wireless services (AWS)), in an effort to handle peak capacity. The CN 202 may include the access and mobility management function (AMF) 204 and user plane function (UPF) 206. The AMF 204 and UPF 206 may perform one or more of the core network functions.

The IAB donor 208 may communicate with the CN 202 (e.g., via a backhaul interface). The IAB donor 208 may communicate with the AMF 204 via an N2 (e.g., NG-C) interface. The IAB donor 208 may communicate with the UPF 206 via an N3 (e.g., NG-U) interface. The IAB donor 208 may include a central unit-control plane (CU-CP) 210, one or more central unit-user plane (CU-UPs) 212, one or more distributed units (DUs) 214-218, and one or more antenna/remote radio units (AU/RRUs) (not shown). The CUs and DUs may also be referred to as gNB-CU and gNB-DU, respectively.

An IAB donor node 208 may also be referred to as an IAB anchor node and may include an IAB central unit (e.g., NR CU) or an IAB Distributed Unit (e.g., NR DU). The IAB network 250 further includes one or more non-donor IAB nodes (e.g., 220a-220e). Each IAB node (including donor and non-donor IAB nodes) may serve one or more UEs (e.g., 222a-222c) connected to an IAB node. As shown, the IAB nodes, including the donor IAB node 208, may be connected via wireless backhaul links (e.g., NR wireless backhaul links or backup NR wireless backhaul links). Each IAB node connects to its served UEs via respective access links.

Each IAB node is a RAN node (e.g., access point and/or gNB) that provides IAB functionality with two roles including data unit function (DU-F) and a mobile termination function (MT-F). The DU-F of an IAB node is generally responsible for scheduling UEs (e.g., served by the IAB node) and other IAB nodes (e.g., that are connected as child nodes to the IAB node). The DU-F also controls both access and backhaul links under its coverage. The MT-F of an IAB node is controlled and scheduled by an IAB donor node or another IAB node as its parent IAB node. In an aspect, the IAB donor node 208 only includes DU-F and no MT-F.

The CU-CP 210 may be connected to one or more of the DUs 214-218. The CU-CP 210 and DUs 214-218 may be connected via a wireline interface using F1-C protocols. As shown in FIG. 2, the CU-CP 210 may be connected to multiple DUs, but the DUs may be connected to only one CU-CP. Although FIG. 2 only illustrates one CU-UP 212, the IAB donor 208 may include multiple CU-UPs. The CU-CP 210 selects the appropriate CU-UP(s) for requested services (e.g., for a UE). The CU-UP(s) 212 may be connected to the CU-CP 210. For example, the CU-UP(s) 212 and the CU-CP 210 may be connected via an E1 interface. The CU-CP(s) 212 may be connected to one or more of the DUs 214, 218. The CU-UP(s) 212 and DUs 214, 218 may be connected via a F1-U interface. As shown in FIG. 2, the CU-CP 210 may be connected to multiple CU-UPS, but the CU-UPs may be connected to only one CU-CP.

A DU, such as DUs 214 and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214, 218 may be connected with one of AU/RRUs.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, IAB donor 208 may support dual connectivity with NR and may share a common fronthaul for LTE and NR. The distributed RAN 200 may enable cooperation between and among DUs 214, 218, for example, via the CU-CP 212. An inter-DU interface may not be used.

Logical functions may be dynamically distributed in the distributed RAN 200. As will be described in more detail with reference to FIG. 4, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
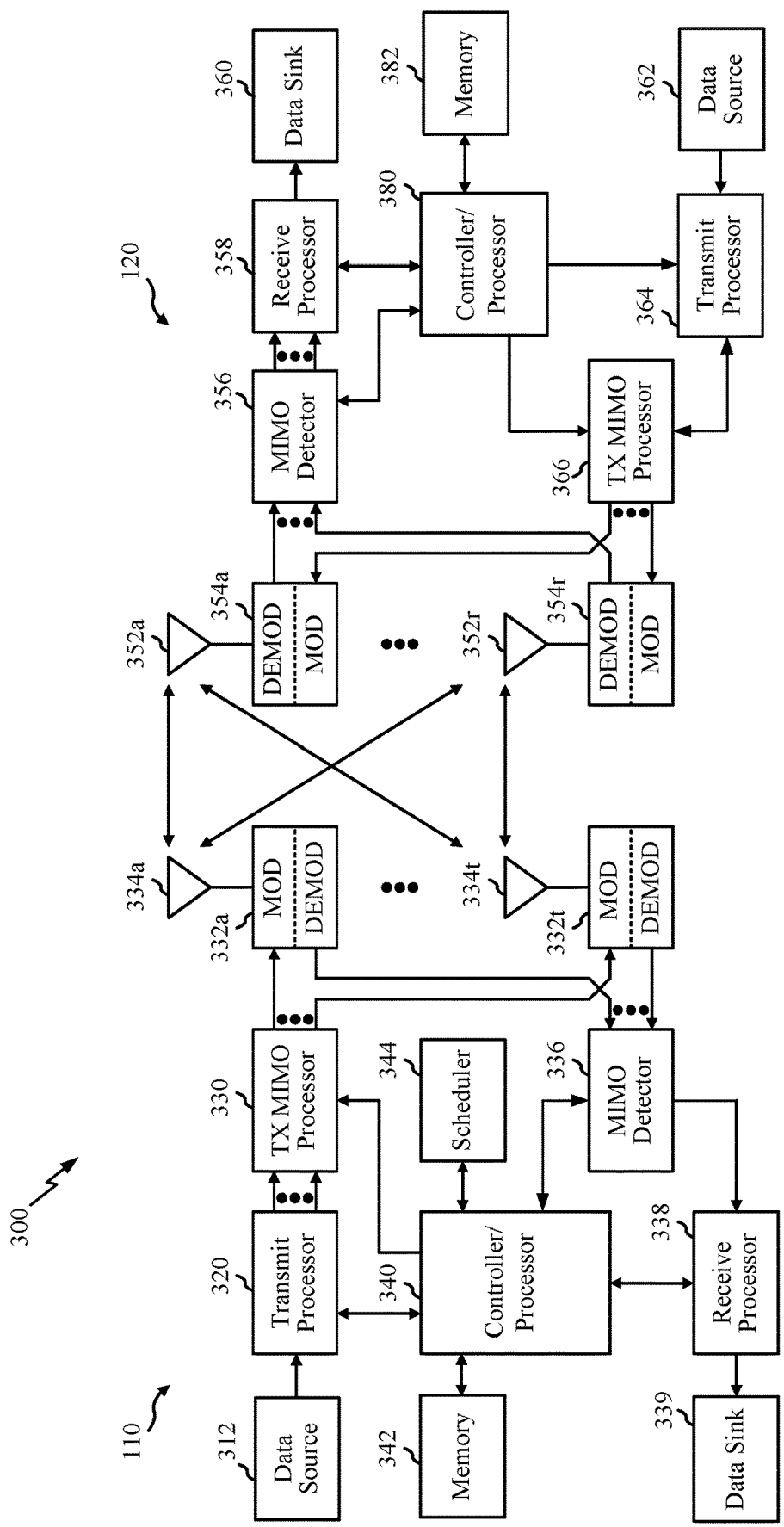
FIG. 3 illustrates example components of a an access point (AP) and a user equipment (UE), in accordance with certain aspects of the present disclosure.

FIG. 3 illustrates example components 300 of AP 110 and UE 120 (as depicted in FIG. 1), which may be used to implement aspects of the present disclosure.

At the AP 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH). The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332 a-332t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a through 334t, respectively.

At the UE 120, the antennas 352a through 352r may receive the downlink signals from the access point 110 and may provide received signals to the demodulators (DEMODs) in transceivers 354a through 354r, respectively. Each demodulator in transceivers 354 a-354r may condition (e.g., filter, amplify, downconvert, and digitize) a respective received signal to obtain input samples. Each demodulator may further process the input samples (e.g., for OFDM, etc.) to obtain received symbols. A MIMO detector 356 may obtain received symbols from all the demodulators in transceivers 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at UE 120, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a-354r (e.g., for SC-FDM, etc.), and transmitted to the access point 110. At the AP 110, the uplink signals from the UE 120 may be received by the antennas 334, processed by the modulators in transceivers 332 a-332t, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the AP 110 and the UE 120, respectively. The processor 340 and/or other processors and modules at the AP 110 may perform or direct the execution of processes for the techniques described herein. The memories 342 and 382 may store data and program codes for AP 110 and UE 120, respectively. A scheduler 344 may schedule UEs for data transmission on the downlink and/or uplink.

The memories 242 and 282 may store data and program codes for AP 110a and UE 120a, respectively. A scheduler 244 may schedule UEs for data transmission on the downlink and/or uplink.

Figure 8:
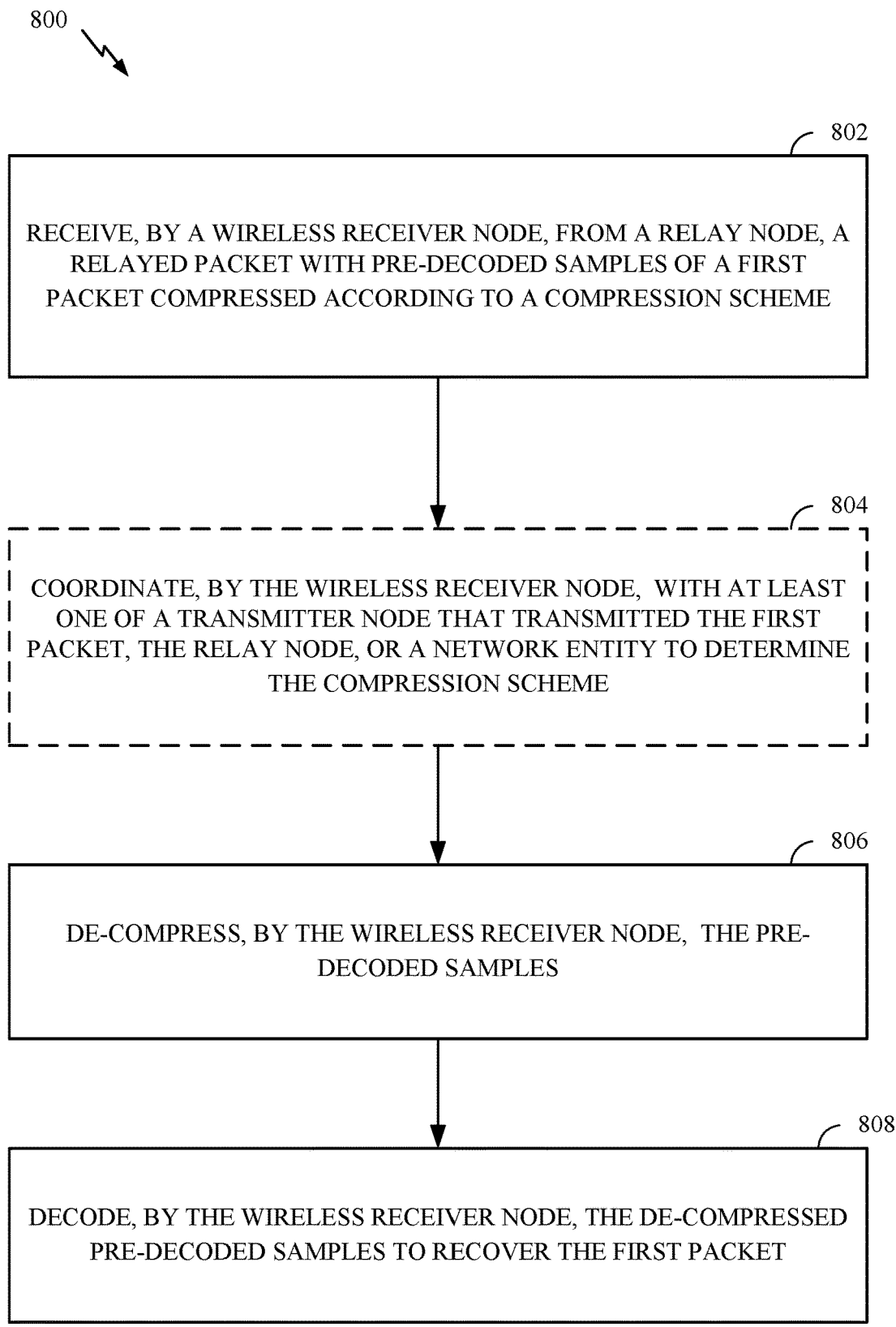
FIG. 8 is a flow diagram illustrating example operations for wireless communications by a wireless receiver node, in accordance with certain aspects of the present disclosure.

Antennas 252, processors 266, 258, 264, and/or controller/processor 280 of the UE 120a and/or antennas 234, processors 220, 230, 238, and/or controller/processor 240 of the AP 110a may be used to perform the various techniques and methods described herein with reference to FIGS. 7 and 8. Although shown at the controller/processor, other components of the UE 120a and AP 110a may be used to perform the operations described herein.

NR may utilize orthogonal frequency division multiplexing (OFDM) with a cyclic prefix (CP) on the downlink (DL) and on the uplink (UL). OFDM and single-carrier frequency division multiplexing (SC-FDM) partition the system bandwidth into multiple (K) orthogonal subcarriers, which are also commonly referred to as tones, bins, etc. Each subcarrier may be modulated with data. Modulation symbols are sent in the frequency domain with OFDM and in the time domain with SC-FDM. The spacing between adjacent subcarriers may be fixed, and the total number of subcarriers may be dependent on the system bandwidth. The minimum resource allocation, called a "resource block" (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 4:
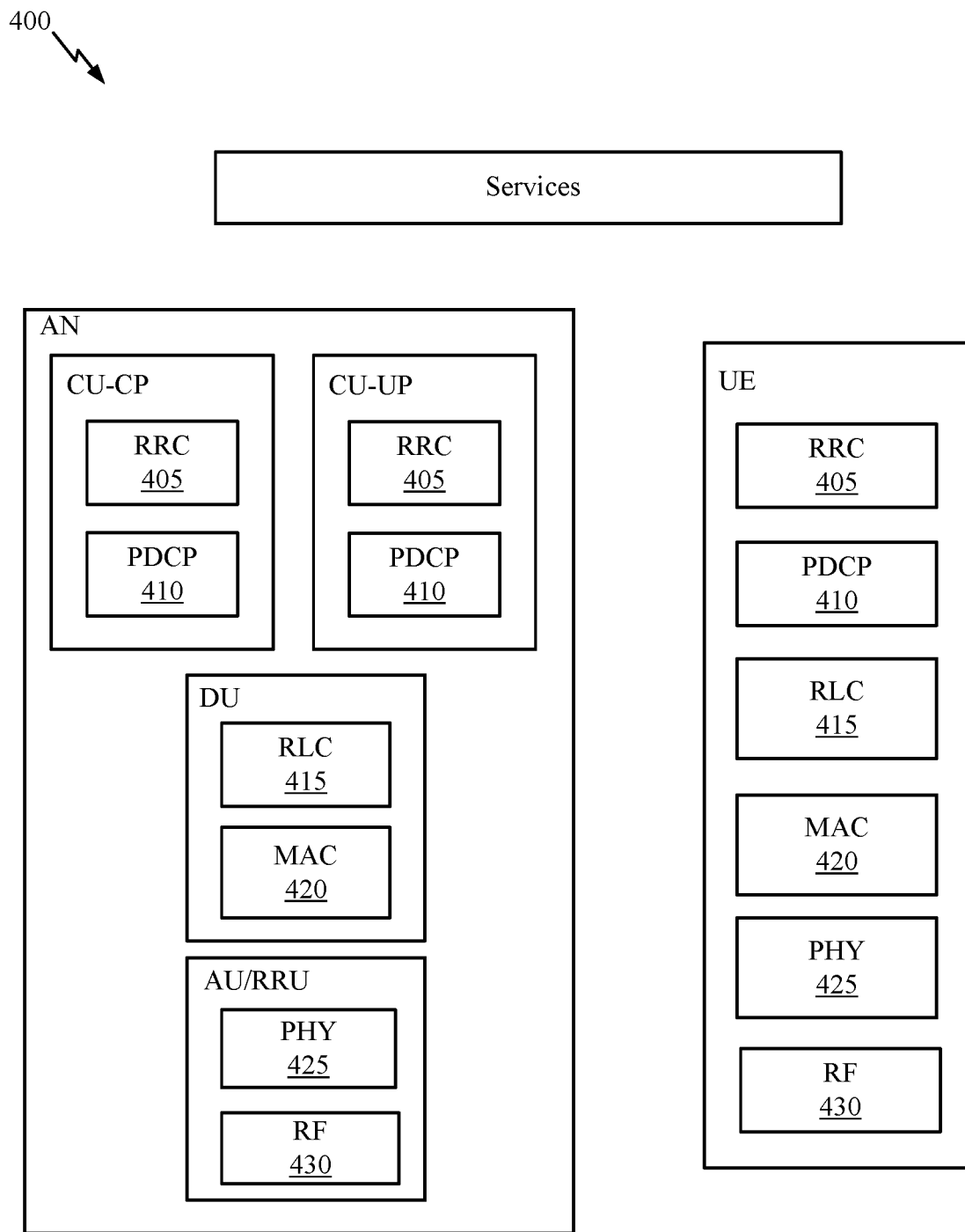
FIG. 4 is a block diagram illustrating an example communications protocol stack in a RAN, in accordance with certain aspects of the present disclosure.

FIG. 4 illustrates a diagram showing examples for implementing a communications protocol stack 400 in a RAN (e.g., such as the RAN 200), according to aspects of the present disclosure. The illustrated communications protocol stack 400 may be implemented by devices operating in a wireless communication system, such as a 5G NR system (e.g., the wireless communication network 100). In various examples, the layers of the protocol stack 400 may be implemented as separate modules of software, portions of a processor or application-specific integrated circuit (ASIC), portions of non-collocated devices connected by a communications link, or various combinations thereof. Collocated and non-collocated implementations may be used, for example, in a protocol stack for a network access device or a UE. As shown in FIG. 4, the system may support various services over one or more protocols. One or more protocol layers of the protocol stack 400 may be implemented by an AN (e.g., AN 208 in FIG. 2, or AP 110a in FIG. 1) and/or the UE (e.g., UE 120).

As shown in FIG. 4, the protocol stack 400 is split in the AN. The RRC layer 405, PDCP layer 410, RLC layer 415, MAC layer 420, physical (PHY) layer 425, and radio frequency (RF) layer 430 may be implemented by the AN. For example, the CU-CP (e.g., CU-CP 210 in FIG. 2) and the CU-UP e.g., CU-UP 212 in FIG. 2) each may implement the RRC layer 405 and the PDCP layer 410. A DU (e.g., DUs 214 and 218 in FIG. 2) may implement the RLC layer 415 and the MAC layer 420. However, the DU may also implement the PHY layer(s) 425 and the RF layer(s) 430 via an AU/RRU connected to the DU. The PHY layers 425 may include a high PHY layer and a low PHY layer.

The UE (e.g., UE 222a-222c) may implement the entire protocol stack 400 (e.g., the RRC layer 405, the PDCP layer 410, the RLC layer 415, the MAC layer 420, the PHY layer(s) 425, and the RF layer(s) 430).

Figure 5:
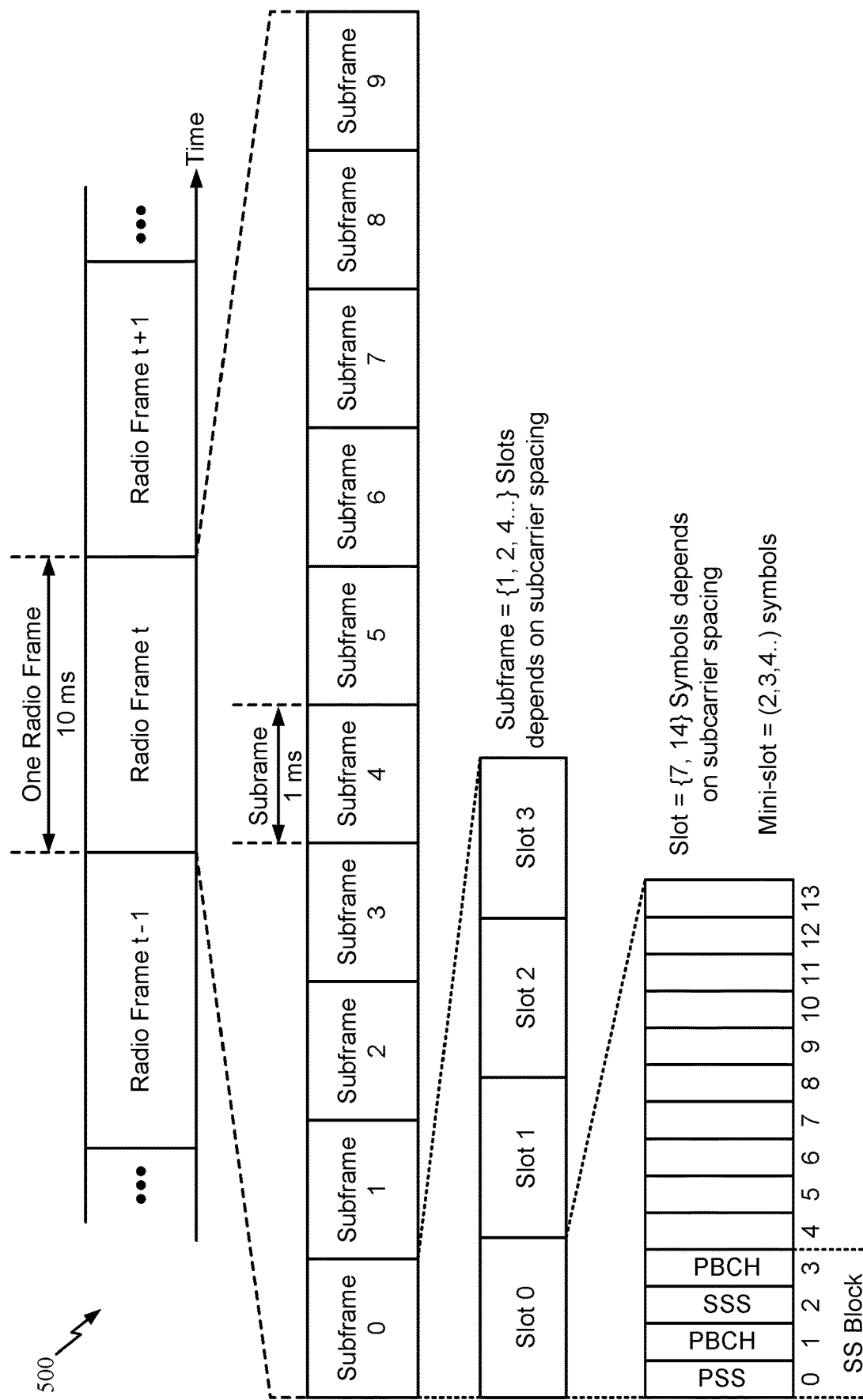
FIG. 5 is a block diagram is a diagram illustrating an example of a frame format for certain wireless communication systems (e.g., new radio (NR)), in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the subcarrier spacing. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. In certain aspects, SSBs may be transmitted in a burst where each SSB in the burst corresponds to a different beam direction for UE-side beam management (e.g., including beam selection and/or beam refinement). The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency regions.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or AP), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., an RRC dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a central unit (CU) to which receiving network access device(s) transmit the measurements of the pilot signals, may use the measurements to identify serving cells for the UEs, or to initiate a change of serving cell for one or more of the UEs.

Next generation (5G) wireless networks have stated objectives to provide ultra-high data rate and support wide scope of application scenarios. IAB systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., 5G NR) and resources (e.g., frequency bands) for both access and backhaul links.

There are various possible architectures for IAB-nodes, including layer-2 (L2) and layer-3 (L3) solutions and a particular architecture deployed may depend on what layers of protocol stack are implemented in the intermediate nodes (IAB-nodes), for example, L2 relays may implement PHY/MAC/RLC layers.

Certain aspects of the present disclosure relate to L1 relays (referred to as repeaters). L1 relays and/or repeaters have many attractive features. For example, such repeaters are relatively simple, low-cost, low-power, and are wirelessly connected to a donor or another relay (e.g., a gNB).

Example Compression Schemes for Relaying Prior to Decoding

Relays may be generally deployed to provide coverage extension. For example, if a direct link between two nodes (e.g., link A→C, between nodes A and C) is poor, a relay (e.g., node B) may be used to provide a better path (A→B→C). Relays may also be used to provide diversity and/or robustness, for example, using both a direct link (e.g., link A→C) and an indirect link (A→B→C), so that if one path fails, the other is available. As noted above, relays may also apply in the context of integrated access and backhaul (IAB) relaying, as well as sidelink relaying (e.g., relaying between two user equipments (UEs)).

Relays are typically classified as analog or decode-and-forward. An analog relay simply receives the waveform in a particular band and forwards it as is. Decode-and-forward relays, on the other hand, have a receiver just like the final destination's receiver. Decode-and-forward relays decode, re-encode, and forward the transmission (e.g., a packet) to the next node (e.g., Rel ease 16 Integrated Access and Backhaul (IAB) relaying). This forwarding may happen at Layer-1 (L1) physical (PHY), Layer-2 (L2) medium access control (MAC) and/or radio link control (RLC), or Layer-3 (L3) radio resource control (RRC) layers, depending on amount of further processing occurring at the relay node in between its receive function and transmit function.

Figure 6:
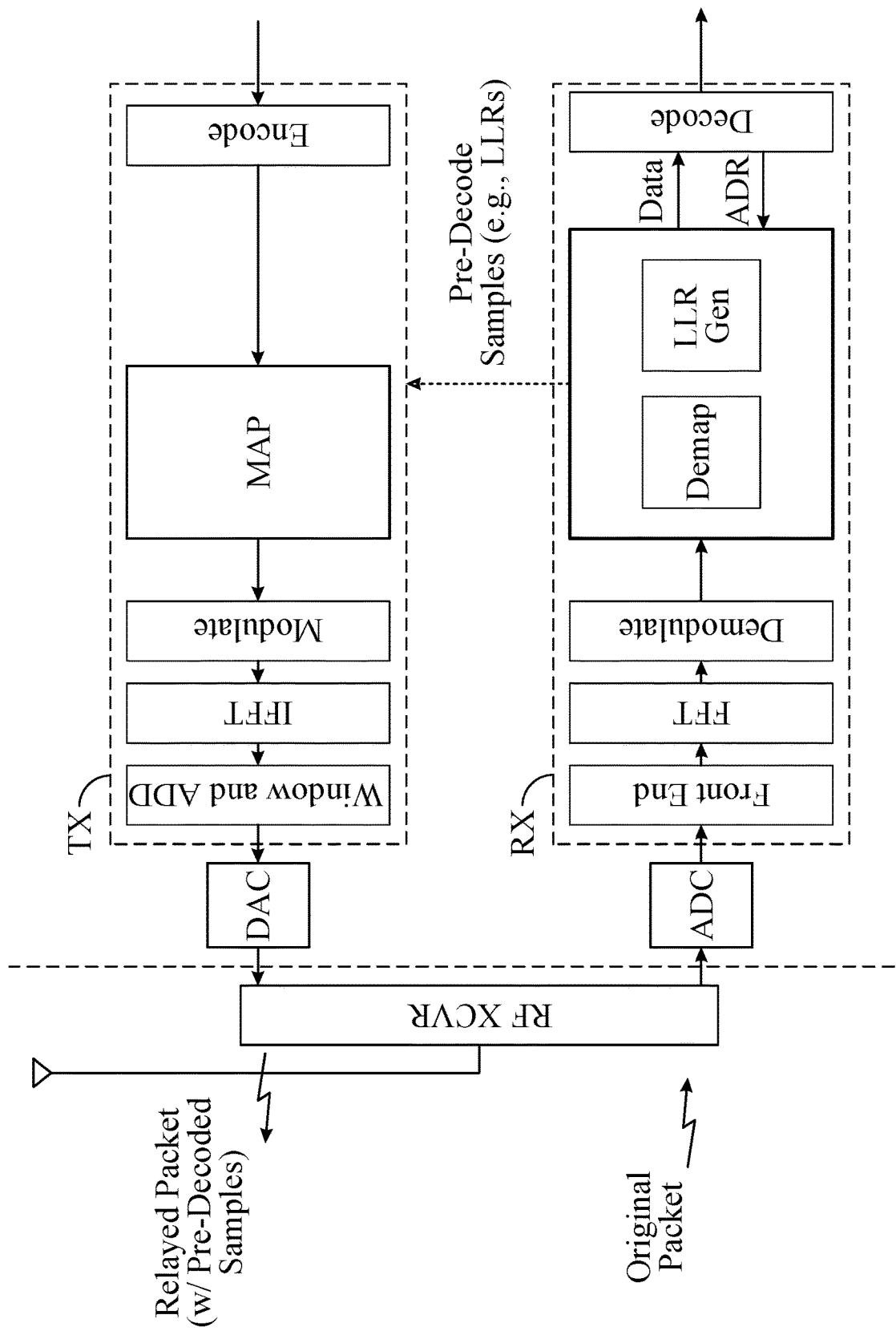
FIG. 6 is a block diagram of an example wireless relay, in which aspects of the present disclosure may be implemented.

As illustrated in FIG. 6, in some cases, a relay may function "in-between" analog relays and decode-and-forward relays. With such relays, some amount of baseband processing may occur, but relaying begins prior to decoding. For example, as illustrated in FIG. 6, the relay may receive an original packet and forward a relayed packet with pre-decoded samples taken from the waveform of the original packet.

Examples of such relaying include forwarding of in-phase/quadrature (I/Q) samples at analog/digital (A/D) conversion, forwarding modulation symbols after orthogonal frequency-division multiplexing (OFDM) Fast Fourier Transform (FFT) or after equalization, forwarding log-likelihood ratios (LLR) input to decoder of channel code (e.g., low-density parity-check code (LDPC) decoder), or forwarding samples computed by intermediate operation of the decoder prior to packet decoding.

By relaying pre-decode samples, such relays may reduce relaying latency (e.g., eliminating decoding time) to the transmission destination (e.g., node C in the example above). Such relaying may also be used to implement cooperative decoding. For example, if the destination is node B, node B may send pre-decoded samples to another node for decoding.

Aspects of the present disclosure may help optimize such relaying. For example, aspects of the present disclosure allow for relaying of compressed pre decoded samples, such as LLRs, for optimized relaying of packets.

FIG. 7 illustrates example operations 700 for wireless communication by a wireless relay node, in accordance with certain aspects of the present disclosure. The operations 700 may be performed, for example, by a UE acting as a repeater (e.g., any of the repeaters shown in FIG. 1 or 6).

Operations 700 begin, at 702, with the wireless relay node receiving, from a transmitter node, a first packet intended for a receiver node.

In some aspects, at 704, the wireless relay node coordinates with at least one of the transmitter node, the receiver node, or a network entity to determine a compression scheme.

At 706, the wireless relay node compresses pre-decoded samples of the first packet according to a compression scheme. The compression scheme used may be determined after the wireless relay node coordinates with at least one of the transmitter node, the receiver node, or a network entity.

At 708, the wireless relay node transmits, to the receiver node, a second packet including the compressed pre-decoded samples.

FIG. 8 illustrates example operations 800 for wireless communication by a wireless receiver node, in accordance with certain aspects of the present disclosure. The operations 800 may be performed, for example, by a wireless receiver node (e.g., any of UEs or APs/gNBs or UEs shown in FIG. 1, 2, or 6) to receive and process a packet from a relay node (performing operations 700).

Operations 800 begin, at 802, with the wireless receiver node receiving, from a wireless relay node, a relayed packet with pre-decoded samples of a first packet compressed according to a compression scheme.

In some aspects, at 804, the wireless receiver node coordinates with at least one of a transmitter node that transmitted the first packet, the wireless relay node, or a network entity to determine the compression scheme.

At 806, the wireless receiver node de-compresses the pre-decoded samples.

Figure 9:
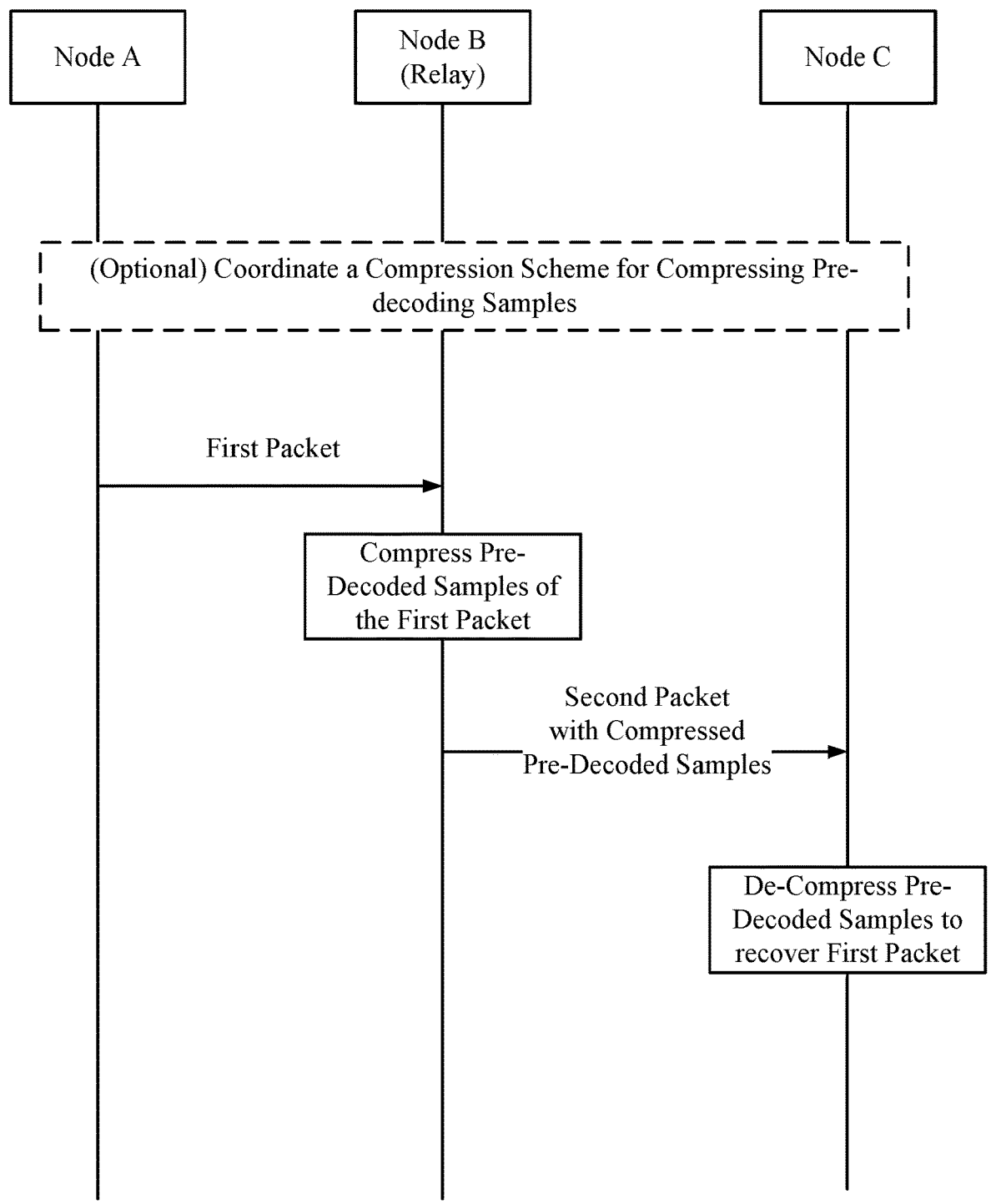
FIG. 9 is a call flow diagram illustrating relaying and compressing pre-decoded samples of a packet, in accordance with certain aspects of the present disclosure.

At 808, the wireless receiver node decodes the de-compressed pre-decoded samples to recover the first packet Operations 700 and 800 of FIGS. 7 and 8 may be understood with reference to the call flow diagram 900 of FIG. 9, which shows how a wireless relay node (e.g., Node B) may relay a packet from a wireless transmitter node (e.g., Node A) to a wireless receiver node (e.g., Node C). In other words, Node B may perform operations 700 of FIG. 7 while Node C performs operations 800 of FIG. 8.

Node A may transmit a first packet to Node B. Node B compresses pre-decoded samples (e.g., LLRs, I-Q samples, etc.) of the first packet and transmits a second packet with compressed pre-decoded samples to Node C. Node C de-compresses the pre-decoded samples to recover the first packet.

Compression may be used to reduce the size of the relayed packet. For example, if the pre-decoded samples are LLRs, each LLR may represent one information bit inside a decoder. LLRs generally represent how likely the signal is either 0 or 1. A large positive LLR value may indicate the decoder believes the information bit represented by the LLR value is 1, while a large negative LLR value may indicate the decoder believes that the information bit represented by the LLR value is 0. LLRs may take on range of values and may require more bits (e.g., 8 bits) to represent 1 information bit. Without compression, a relayed packet containing 8-bit LLRs may be larger (e.g., eight times larger).

To save storage space (e.g., using LLR memory for internal decoding), even without relaying, a node may implement LLR compression. In such cases, the node may use same compression scheme as used for relaying or may use a different scheme for internal decoding.

To enable the compressed pre-decoded sample scheme described herein, the wireless receiver node (e.g., node C) may have information to understand the content of the relayed packets (e.g., type of pre-decoded samples) and the compression format, so it is able to decompress and decode to recover the underlying packet.

As shown in FIG. 9, in some examples, the nodes may coordinate the compression scheme used by the relay node (e.g., Node B) for compressing pre-decoded samples. The scheme may be set by Node A, B, C, or a coordinating central node (e.g., a base-station), or by a combination of these nodes working in coordination with each other. For example, the nodes may coordinate via an exchange messages to determine the compression scheme via Uu, sidelink (SL) master information block (MIB), system information block (SIB), radio resource control (RRC), media access control (MAC) control element (MAC-CE), downlink control information (DCI), sidelink control information (SCI) or a combination thereof. In some cases, a scheduling DCI (e.g., scheduling the transmission being relayed), SCI or MAC-CE included with the packet may indicate that the packet contains LLRs, and the LLR format.

In some cases, a receiver node (e.g., Node C in FIG. 9) may indicate its LLR processing capabilities and preferred formats to the relay node (e.g., Node B), which then may pick from among the processing capabilities and preferred formats (e.g., based on alignment with Node B's preferred format for internal use). The compression scheme selected may also depend on the nature of the nodes (whether the node is a UE, a gNB, or an IAB-node).

The compression scheme used for pre-decoded samples may be any suitable compression scheme. For example, the compression scheme may be Lempel-Ziv-Welch (LZW) compression, Huffman coding, Burroughs-Wheeler scheme and standard implementations thereof (e.g., gzip or bzip2).

In some cases, the compression schemes presented herein may be based on the nature of LLRs. For example, the compression scheme may involves compressing an N-bit LLR value to fewer bits, for example, by quantizing different LLRs to different precision (e.g., number of bits).

In some cases, the quantization may be non-uniform (e.g., via 'compounding') whose parameters (e.g., dynamic range, nonlinearity function) may also be different for different LLRs. For example, a 4-bit LLR value ranging from −8 to 7 may be quantized to 1 bit, which indicates LLR of −4 or +4, −8 or +8, or a hard-decoded bit (e.g., 0 or 1).

In some cases, the compression scheme may involve partitioning LLRs into groups, each with its own set of quantization parameters. The LLR groups may be based on channel code structure (e.g., one group for systematic bits, another group for the parity-check bits in LDPC), a hybrid automatic repeat request (HARQ) scheme, a code block (CB) or code block group (CBG) index, an explicit indication, or a use case for the compression scheme. For an LLR group based on a HARQ scheme, the HARQ scheme may depend on a new data indicator (NDI), a HARQ (re)

transmission attempt index, and/or a redundancy version (RV) identifier. For an LLR group based on a CB or CBG index, each CB and/or CBG may have a different set of parameters (e.g., some CBs have hard bits, some CBs have LLRs). For an LLR group based on an explicit indication, each group may be an indicated subset (e.g., a range) of bit-indices. The subsets may be indicated by a combination of configuration and dynamic signaling. For an LLR group based on a use case, the use case may involve a comparison of cooperative decoding and relaying.

Some amount of signaling overhead may be incurred to indicate the LLR partition. In some cases, the choice of LLR partition may be guided by minimizing the overhead and/or overall compressed output. The choice of the LLR partition may depend on further compression scheme applied after quantization.

In some cases, a scheme may implement combinations of the techniques described herein may be used. For example, one such scheme may involve first smart quantization and then some form of compression.

As described herein, by relaying pre-decode samples, relaying latency may be reduced. Further, by compressing the pre-decoded samples, payload size may be managed. Such relaying may also be used to implement cooperative decoding, for example, if the destination is node B (that may send pre-decoded samples to another node for decoding).

Figure 10:
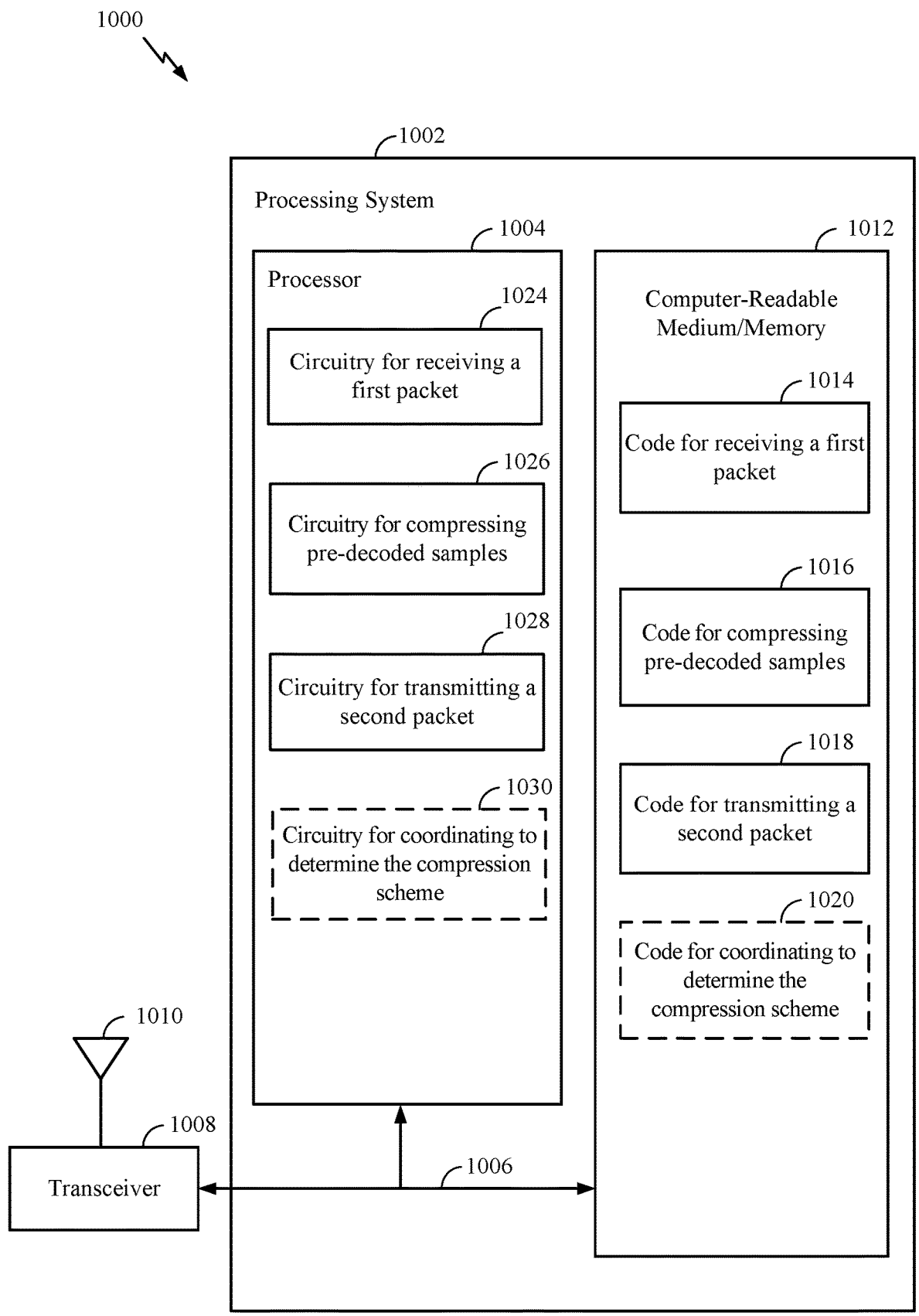
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein for compressing packets for relaying that include information generated prior to decoding. In certain aspects, computer-readable medium/memory 1012 stores code 1014 for receiving, from a transmitter node, a first packet intended for a receiver node; code 1016 for compressing pre-decoded samples of the first packet according to a compression scheme; and code 1018 for transmitting, to the receiver node, a second packet included the compressed pre-decoded samples. In certain aspects, computer-readable medium/memory 1012 may store code 1020 for coordinating with at least one of the transmitter node, the receiver node, or a network entity to determine the compression scheme. In certain aspects, the processor 1004 has circuitry configured to implement the code stored in the computer-readable medium/memory 1012. The processor 1004 includes circuitry 1024 for receiving, from a transmitter node, a first packet intended for a receiver node; circuitry 1026 for compressing pre-decoded samples of the first packet according to a compression scheme; and circuitry 1028 for transmitting, to the receiver node, a second packet included the compressed pre-decoded samples. In certain aspects, processor 1004 may include circuitry 1030 for coordinating with at least one of the transmitter node, the receiver node, or a network entity to determine the compression scheme.

For example, means for transmitting (or means for outputting for transmission) may include a transmitter and/or an antenna(s) 234 or the AP 110a or the transmitter unit 254 and/or antenna(s) 252 of the UE 120a illustrated in FIG. 2 and/or circuitry 1028 of the communication device 1000 in FIG. 10. Means for receiving (or means for obtaining) may include a receiver and/or an antenna(s) 234 of the AP 110a or a receiver and/or antenna(s) 252 of the UE 120a illustrated in FIG. 2 and/or circuitry 1024 of the communication device 1000 in FIG. 10. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the AP 110a or the receive processor 258, the transmit processor 264, the TX MIMO processor 266, and/or the controller/processor 280 of the UE 120a illustrated in FIG. 2 and/or the processing system 1002 of the communication device 1000 in FIG. 10.

Figure 11:
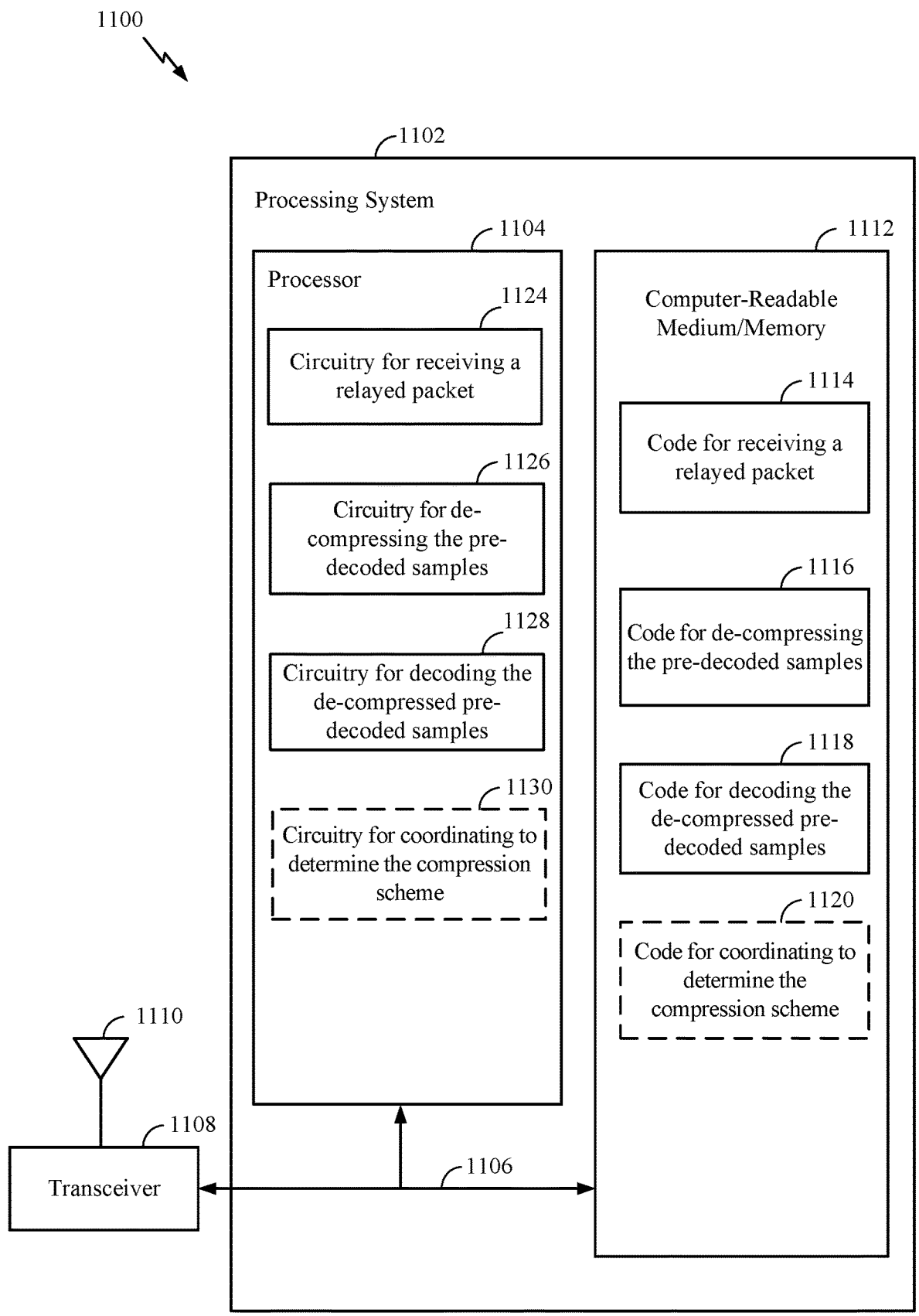
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein for compressing packets for relaying that include information generated prior to decoding. In certain aspects, computer-readable medium/memory 1112 stores code 1114 for receiving, from a relay node, a relayed packet with pre-decoded samples of a first packet compressed according to a compression scheme; code 1116 for de-compressing the pre-decoded samples; and code 1118 for decoding the de-compressed pre-decoded samples to recover the first packet. In certain aspects, computer-readable medium/memory 1112 may store code 1120 for coordinating with at least one of a transmitter node that transmitted the first packet, the relay node, or a network entity to determine the compression scheme. In certain aspects, the processor 1104 has circuitry configured to implement the code stored in the computer-readable medium/memory 1112. The processor 1104 includes circuitry 1124 for receiving, from a relay node, a relayed packet with pre-decoded samples of a first packet compressed according to a compression scheme; circuitry 1126 for de-compressing the pre-decoded samples; and circuitry 1128 for decoding the de-compressed pre-decoded samples to recover the first packet. In certain aspects, processor 1104 may include circuitry 1130 for coordinating with at least one of a transmitter node that transmitted the first packet, the relay node, or a network entity to determine the compression scheme.

For example, means for transmitting (or means for outputting for transmission) may include a transmitter and/or an antenna(s) 234 or the AP 110a or the transmitter unit 254 and/or antenna(s) 252 of the UE 120a illustrated in FIG. 2. Means for receiving (or means for obtaining) may include a receiver and/or an antenna(s) 234 of the AP 110a or a receiver and/or antenna(s) 252 of the UE 120a illustrated in FIG. 2 and/or circuitry 1124 of the communication device 1100 in FIG. 11. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the AP 110a or the receive processor 258, the transmit processor 264, the TX MIMO processor 266, and/or the controller/processor 280 of the UE 120a illustrated in FIG. 2 and/or the processing system 1102 of the communication device 1100 in FIG. 11.

EXAMPLE ASPECTS

Implementation examples are described in the following numbered aspects:

Aspect 1: A method for wireless communications by a wireless relay node, comprising: receiving, from a transmitter node, a first packet intended for a receiver node; compressing pre-decoded samples of the first packet according to a compression scheme; and transmitting, to the receiver node, a second packet including the compressed pre-decoded samples.

Aspect 2: The method of aspect 1, wherein the wireless relay node also compresses pre-decoded samples of packets for which the wireless relay node is the intended recipient.

Aspect 3: The method of aspect 2, wherein the wireless relay node uses different compression schemes for compressing the pre-decoded samples of the first packet and pre-decoded samples of packets for which the wireless relay node is the intended recipient.

Aspect 4: The method of any of aspects 1-3, further comprising coordinating with at least one of: the transmitter node, the receiver node, or a network entity to determine the compression scheme.

Aspect 5: The method of aspect 4, wherein the coordinating comprises: receiving pre-decoded sample processing capabilities and preferred compression schemes from the receiver node; and selecting a compression format for the at least one of the transmitter node, the receiver node, or a network entity.

Aspect 6: The method of any of aspects 4-5, wherein the compression scheme depends, at least in part, on whether the receiver node is one of: a user equipment, a base station, or an integrated access and backhaul (IAB) node.

Aspect 7: The method of any of aspects 4-6, wherein the coordinating involves at least one of: an interface with the network entity, a sidelink (SL) master information block (MIB), a system information block (SIB), radio resource control (RRC), a medium access control (MAC) control element (CE), downlink control information (DCI), or sidelink control information (SCI).

Aspect 8: The method of aspect 7, wherein at least one of the MAC-CE, DCI, or SCI indicates that the second packet comprises a log-likelihood ratio (LLR) and an LLR format.

Aspect 9: The method of any of aspects 1-8, wherein the pre-decoded samples comprise at least one of log-likelihood ratios (LLRs) or in-phase and quadrature (IQ) samples.

Aspect 10: The method of aspect 9, wherein the compression scheme involves compressing N-bit pre-decoded sample values.

Aspect 11: The method of aspect 10, wherein a quantization scheme quantizes different ranges of pre-decoded sample values differently.

Aspect 12: The method of any of aspects 10-11, wherein the wireless relay node partitions pre-decoded sample values into groups, each with its own set of quantization parameters.

Aspect 13: The method of aspect 12, wherein the partitioning is based on at least one of: a channel code structure, a hybrid automatic repeat request scheme, a code block or code block group index, an explicit indication, or a use case for the compression scheme.

Aspect 14: The method of any of aspect 12-13, wherein the partitioning may is based on an objective to reduce signaling overhead using a further compression scheme applied after quantization.

Aspect 15: A method for wireless communications by a wireless receiver node, comprising: receiving, from a relay node, a relayed packet with pre-decoded samples of a first packet compressed according to a compression scheme; de-compressing the pre-decoded samples; and decoding the de-compressed pre-decoded samples to recover the first packet.

Aspect 16: The method of aspect 15, further comprising coordinating with at least one of: a transmitter node that transmitted the first packet, the relay node, or a network entity to determine the compression scheme.

Aspect 17: The method of aspect 16, wherein the coordinating comprises: conveying pre-decoded sample processing capabilities and preferred compression schemes to the transmitter node, the relay node, or the network entity; and receiving an indication of a selected compression format for the at least one of the transmitter node, the relay node, or a network entity.

Aspect 18: The method of any of aspects 16-17, wherein the compression scheme depends, at least in part, on whether the receiver node is one of: a user equipment, a base station, or an integrated access and backhaul (IAB) node.

Aspect 19: The method of any of aspects 16-18, wherein the coordinating involves at least one of: an interface with the network entity, a sidelink (SL) master information block (MIB), a system information block (SIB), radio resource control (RRC), a medium access control (MAC) control element (CE), downlink control information (DCI), or sidelink control information (SCI).

Aspect 20: The method of aspect 19, wherein at least one of the MAC-CE, DCI, or SCI indicates that the relayed packet comprises a log-likelihood ratios (LLRs) and an LLR format.

Aspect 21: The method of any of aspects 15-20, wherein the pre-decoded samples comprise at least one of log-likelihood ratios (LLRs) or in-phase and quadrature (IQ) samples.

Aspect 22: The method of aspect 21, wherein the compression scheme involves compressing N-bit pre-decoded sample values.

Aspect 23: The method of aspect 22, wherein a quantization scheme quantizes different ranges of pre-decoded sample values differently.

Aspect 24: The method of aspect 23, wherein the relay node partitions values of the pre-decoded samples values into groups, each with its own set of quantization parameters.

Aspect 25: The method of aspect 24, wherein the partitioning is based on at least one of: a channel code structure, a hybrid automatic repeat request scheme, a code block or code block group index, an explicit indication, or a use case for the compression scheme.

Aspect 26: The method of any of aspects 24-25, wherein the partitioning is based on an objective to reduce signaling overhead using a further compression scheme applied after quantization.

Aspect 27: An apparatus comprising means for performing the method of any of aspects 1 through 26.

Aspect 28: An apparatus comprising at least one processor and a memory coupled to the at least one processor, the memory comprising code executable by the at least one processor to cause the apparatus to perform the method of any of aspects 1 through 26.

Aspect 29: A computer readable medium storing computer executable code thereon for wireless communications that, when executed by at least one processor, cause an apparatus to perform the method of any of aspects 1 through 26.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies. NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR AP, 5G NB, or transmission reception point (TRP) may be used interchangeably.

An AP may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). An AP for a macro cell may be referred to as a macro AP. An AP for a pico cell may be referred to as a pico AP. An AP for a femto cell may be referred to as a femto AP or a home AP.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with an AP, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., an AP) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Access points are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7-8.

Further, it should be appreciated that modules and/or other appropriate means for performing the methods and techniques described herein can be downloaded and/or otherwise obtained by a user terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

What is claimed is:

1. An apparatus for wireless communications by a A relay node, comprising:
 one or more processors configured to execute instructions stored on one or more memories and to cause the relay node to:
  receive, from a transmitter node, a first packet intended for a receiver node;
  without decoding the first packet, compress pre-decoded samples of the first packet according to a compression scheme, wherein the pre-decoded samples comprise log-likelihood ratios (LLRs) of the first packet; and transmit, to the receiver node, a second packet including the compressed pre-decoded samples.

2. The relay node of claim 1, wherein the one or more processors are further configured to cause the relay node to compress pre-decoded samples of packets for which the relay node is the intended recipient.

3. The relay node of claim 2, wherein the one or more processors are further configured to cause the relay node to use different compression schemes for compressing the pre-decoded samples of the first packet and pre-decoded samples of packets for which the relay node is the intended recipient.

4. The relay node of claim 1, wherein the one or more processors are further configured to cause the relay node to coordinate with at least one of the transmitter node, the receiver node, or a network entity to determine the compression scheme.

5. The relay node of claim 4, wherein, in order to coordinate, the one or more processors are configured to cause the relay node to:

receive pre-decoded sample processing capabilities and preferred compression schemes from the receiver node; and select a compression format for the at least one of the transmitter node, the receiver node, or a network entity.

6. The relay node of claim 4, wherein the compression scheme depends, at least in part, on whether the receiver node is one of: a user equipment, a base station, or an integrated access and backhaul (IAB) node.

7. The relay node of claim 4, wherein the one or more processors are configured to cause the relay node to coordinate based on at least one of: an interface with the network entity, a sidelink (SL) master information block (MIB), a system information block (SIB), radio resource control (RRC), a medium access control (MAC) control element (CE), downlink control information (DCI), or sidelink control information (SCI).

8. The relay node of claim 7, wherein at least one of the MAC-CE, DCI, or SCI indicates that the second packet comprises the LLRs and an LLR format.

9. The relay node of claim 1, wherein the compression scheme involves compressing N-bit pre-decoded sample values.

10. The relay node of claim 9, wherein a quantization scheme quantizes different ranges of pre-decoded sample values differently.

11. The relay node of claim 9, wherein the one or more processors are further configured to cause the relay node to partition pre-decoded sample values into groups, each with its own set of quantization parameters.

12. The relay node of claim 11, wherein the one or more processors are configured to cause the relay node to partition the decoded sample values based on at least one of: a channel code structure, a hybrid automatic repeat request scheme, a code block or code block group index, an explicit indication, or a use case for the compression scheme.

13. The relay node of claim 11, wherein the one or more processors are configured to cause the relay node to partition the decoded sample values based on an objective to reduce signaling overhead using a further compression scheme applied after quantization.

14. A wireless receiver node, comprising:

one or more processors configured to execute instructions stored on one or more memories and to cause the wireless receiver node to:

receive, from a relay node, a relayed packet with pre-decoded samples of a first packet compressed according to a compression scheme without decoding of the first packet, wherein the pre-decoded samples comprise log-likelihood ratios (LLRs) of the first packet;

de-compress the pre-decoded samples; and decode the de-compressed pre-decoded samples to recover the first packet.

15. The wireless receiver node of claim 14, wherein the one or more processors are further configured to cause the wireless receiver node to coordinate with at least one of: a transmitter node that transmitted the first packet, the relay node, or a network entity to determine the compression scheme.

16. The wireless receiver node of claim 15, wherein, in order to coordinate, the one or more processors are configured to cause the wireless receiver node to:

convey pre-decoded sample processing capabilities and preferred compression schemes to the at least one of transmitter node, the relay node, or the network entity; and receive an indication of a selected compression format for the at least one of the transmitter node, the relay node, or the network entity.

17. The wireless receiver node of claim 15, wherein the compression scheme depends, at least in part, on whether the receiver node is one of: a user equipment, a base station, or an integrated access and backhaul (IAB) node.

18. The wireless receiver node of claim 15, wherein the one or more processors are configured to cause the wireless receiver node to coordinate based on at least one of: an interface with the network entity, a sidelink (SL) master information block (MIB), a system information block (SIB), radio resource control (RRC), a medium access control (MAC) control element (CE), downlink control information (DCI), or sidelink control information (SCI).

19. The wireless receiver node of claim 18, wherein at least one of the MAC-CE, DCI, or SCI indicates that the relayed packet comprises the LLRs and an LLR format.

20. The wireless receiver node of claim 14, wherein the compression scheme involves compressing N-bit pre-decoded sample values.

21. The wireless receiver node of claim 20, wherein a quantization scheme quantizes different ranges of pre-decoded sample values differently.

22. The wireless receiver node of claim 21, wherein the pre-decoded sample values are partitioned into groups, each with its own set of quantization parameters.

23. The wireless receiver node of claim 22, wherein the pre-decoded sample values are partitioned into the groups based on at least one of: a channel code structure, a hybrid automatic repeat request scheme, a code block or code block group index, an explicit indication, or a use case for the compression scheme.

24. The wireless receiver node of claim 23, wherein the pre-decoded sample values are partitioned into the groups based on an objective to reduce signaling overhead using a further compression scheme applied after quantization.

25. A method for wireless communications by a wireless relay node, comprising:

receiving, from a transmitter node, a first packet intended for a receiver node;

without decoding the first packet, compressing pre-decoded samples of the first packet according to a compression scheme, wherein the pre-decoded samples comprise log-likelihood ratios (LLRs) of the first packet; and transmitting, to the receiver node, a second packet including the compressed pre-decoded samples.

26. The method of claim 25, further comprising coordinating with at least one of:

the transmitter node, the receiver node, or a network entity to determine the compression scheme, wherein the coordinating comprises:

receiving pre-decoded sample processing capabilities and preferred compression schemes from the receiver node; and selecting a compression format for the at least one of the transmitter node, the receiver node, or a network entity.

27. A method for wireless communications by a wireless receiver node, comprising:

receiving, from a relay node, a relayed packet with pre-decoded samples of a first packet compressed according to a compression scheme without decoding of the first packet, wherein the pre-decoded samples comprise log-likelihood ratios (LLRs) of the first packet;

de-compressing the pre-decoded samples; and decoding the de-compressed pre-decoded samples to recover the first packet.

28. The method of claim 27, further comprising coordinating with at least one of: a transmitter node that transmitted the first packet, the relay node, or a network entity to determine the compression scheme, wherein the coordinating comprises:

conveying pre-decoded sample processing capabilities and preferred compression schemes to the transmitter node, the relay node, or the network entity; and receiving an indication of a selected compression format for the at least one of the transmitter node, the receiver node, or a network entity.

* * * * *